(12) United States Patent
Ganz et al.

(10) Patent No.: US 10,757,549 B2
(45) Date of Patent: Aug. 25, 2020

(54) LOW ENERGY MESH NETWORK WITH VIRTUAL ITEM CONTAINER

(71) Applicant: TAG-IT TAG INC, Scottsdale, AZ (US)

(72) Inventors: Neil L. Ganz, Scottsdale, AZ (US); Stephan R. Van Fleteren, San Carlos, CA (US); Dennis W. Farmer, Grass Valley, CA (US)

(73) Assignee: TAG-IT TAG INC., Scottsdale, AZ (US)

( * ) Notice: Subject to any disclaimer, the term of this patent is extended or adjusted under 35 U.S.C. 154(b) by 67 days.

(21) Appl. No.: 16/186,569

(22) Filed: Nov. 11, 2018

(65) Prior Publication Data
US 2020/0154246 A1 May 14, 2020

(51) Int. Cl.
| | |
|---|---|
| *H04W 4/35* | (2018.01) |
| *H04W 4/029* | (2018.01) |
| *H04W 4/33* | (2018.01) |
| *H04M 1/725* | (2006.01) |
| *G06Q 30/06* | (2012.01) |
| *G06K 7/10* | (2006.01) |
| *H04W 4/80* | (2018.01) |
| *H04W 84/20* | (2009.01) |

(52) U.S. Cl.
CPC .......... *H04W 4/35* (2018.02); *G06K 7/10297* (2013.01); *G06Q 30/0633* (2013.01); *H04M 1/72527* (2013.01); *H04W 4/029* (2018.02); *H04W 4/33* (2018.02); *H04W 4/80* (2018.02); *H04W 84/20* (2013.01)

(58) Field of Classification Search
CPC ......... H04W 4/35; H04W 4/33; H04W 4/029; H04W 4/80; H04W 84/20; G06Q 30/0633; G06Q 30/0601; G06K 7/10386; G06K 7/10316; G06K 7/10297; H04M 1/72527

See application file for complete search history.

(56) References Cited

U.S. PATENT DOCUMENTS

| | | |
|---|---|---|
| 8,350,928 B2 | 1/2013 | Anderson |
| 8,531,555 B2 | 9/2013 | Anderson |
| 8,629,773 B2 | 1/2014 | Rhie et al. |
| 8,665,083 B2 | 3/2014 | Easley et al. |
| 8,764,571 B2 | 7/2014 | Sarmenta |
| 9,092,651 B2 | 7/2015 | Ching |
| 9,234,757 B2 | 1/2016 | Skaaksrud et al. |
| 9,768,837 B2 | 9/2017 | Charvat et al. |
| 9,797,988 B2 | 10/2017 | Charvat et al. |

(Continued)

FOREIGN PATENT DOCUMENTS

| | | |
|---|---|---|
| WO | 2016118025 A1 | 7/2016 |
| WO | 2016205216 A1 | 12/2016 |

(Continued)

*Primary Examiner* — Margaret G Mastrodonato
(74) *Attorney, Agent, or Firm* — Lawrence N. Ginsberg

(57) ABSTRACT

A low energy mesh network system, including a mesh network; a central station, a low energy enhanced positional accuracy low energy (EPALE) central station and product local fixed enhanced positional accuracy low energy (EP-ALE) beacons. The mesh network defines a virtual item container having virtual item container nodes defining boundaries for a physical container. The mesh network tracks items to be positioned within the physical container.

14 Claims, 5 Drawing Sheets

(56) References Cited

U.S. PATENT DOCUMENTS

| | | |
|---|---|---|
| 9,860,882 B2 | 1/2018 | Sapio et al. |
| 2004/0111320 A1* | 6/2004 | Schlieffers ............ B62B 3/1424 |
| | | 705/16 |
| 2013/0264388 A1 | 10/2013 | Grimlund et al. |
| 2013/0320085 A1* | 12/2013 | Chen ...................... G06Q 30/02 |
| | | 235/385 |
| 2014/0129307 A1 | 5/2014 | Walker et al. |
| 2015/0025969 A1 | 1/2015 | Schroll et al. |
| 2015/0156605 A1* | 6/2015 | Skaaksrud .......... G06Q 10/0835 |
| | | 455/456.1 |
| 2015/0341225 A1 | 11/2015 | Baarman et al. |
| 2016/0171486 A1 | 6/2016 | Wagner et al. |
| 2016/0180327 A1 | 6/2016 | Stern et al. |
| 2016/0363648 A1 | 12/2016 | Mindell et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0371636 A1 | 12/2016 | Douglas et al. |
| 2017/0140331 A1* | 5/2017 | Rinzler ................... H02J 50/10 |
| 2017/0176572 A1 | 6/2017 | Charvat et al. |
| 2017/0179570 A1 | 6/2017 | Charvat |
| 2017/0179571 A1 | 6/2017 | Charvat et al. |
| 2017/0179602 A1 | 6/2017 | Charvat et al. |
| 2017/0179603 A1 | 6/2017 | Charvat et al. |
| 2017/0180011 A1 | 6/2017 | Charvat et al. |
| 2017/0181118 A1 | 6/2017 | Charvat et al. |
| 2017/0201005 A1 | 7/2017 | Charvat et al. |
| 2017/0316656 A1 | 11/2017 | Chaubard et al. |
| 2017/0328980 A1 | 11/2017 | Charvat et al. |

FOREIGN PATENT DOCUMENTS

| | | |
|---|---|---|
| WO | 2016205217 A1 | 12/2016 |
| WO | 2016205218 A1 | 12/2016 |
| WO | 2016205219 A1 | 12/2016 |

* cited by examiner

LOW ENERGY MESH NETWORK WITH VIRTUAL ITEM CONTAINER

BACKGROUND OF THE INVENTION

1. Field of the Invention

The present invention generally relates to systems, apparatus and methods in the field of tracking items (e.g., an object, a package, a person, a piece of equipment) and, more particularly, to various aspects involving systems, apparatus and methods for improved asset identification, location services, and node management using an adaptive, context-aware wireless node network.

2. Description of the Related Art

Reliably determining a set of items that are being transported from one place to another is a problem that exists in multiple fields and disciplines.

As one example, a consumer at a brick-and-mortar store location may place many items into a single shopping cart. When the consumer reaches a point of sale device, such as a cash register or a self-checkout device, the consumer must unload all the items from the cart, place them on a conveyor belt, manually scan each item or select each item from a menu. After paying for the items, the consumer or a clerk must place each item into a new bag and repack the shopping cart. Buying large items has its own attendant issues, typically involving the need to find a sales representative for assistance. Present methods for shopping are prone to errors, such as the clerk accidentally scanning an item twice or not scanning an item at all, that can lead to the consumer being charged too much or the store location giving away an item without payment. In addition to accompanying errors that take place it takes a long time to conduct these exercises.

While some computerized solutions exist for tracking items, they typically rely on large equipment that manually scans each item and requires confirmation from a user before taking any action with those items (such as purchase or movement of the items). This is inconvenient. Moreover, such systems typically require specialized equipment that is expensive, require manual entry of information about the items, cannot determine when a user has decided to not keep an item, cannot perform functions or initiate transactions for the user, and do not provide the interactivity necessary to ensure that a user fully understands when an item is ready to be purchased or checked out.

There is thus a need to address these and other issues. The present disclosure provides devices, methods, systems, and computer-readable media to solve these and other issues. As will be disclosed below the present inventive concepts is not limited to use in the retail store environment and can be utilized in many fields, such as food processing and transportation.

As partial solutions to this problem there have been some previously proposed methods and systems:

U.S. Pat. No. 8,629,773B2, issued to S. Rhie, entitled METHOD FOR MEASURING LOCATION OF RADIO FREQUENCY IDENTIFICATION READER BY USING BEACON, discloses a method for measuring a location of a radio frequency identification (RFID) reader by using beacons, and an RFID system for measuring a location of a moving RFID reader in an RFID system comprising: a plurality of beacon devices for emitting beacons; an RFID tag for transmitting pre-stored information by using radio frequency identification; and an RFID reader for calculating a current location using a plurality of at least three beacons wherein the RFID reader receives the plurality of beacons from the plurality of beacon devices while moving, and receiving the information from the RFID tag by using the radio frequency identification. According to the '773 patent, it is possible to increase the accuracy of the location measurement of a moving RFID reader in an RFID system because the location of the RFID reader is measured in consideration of propagation environments. However, the '773 is deficient in various ways, for example it has relatively low inter-node quality, does not identify the RF standard used; i.e. WiFi, BLE, NFC, GPS, UWB. Furthermore, along with other deficiencies, it does not describe how the mesh network can be used to determine ownership/possession of a node (product).

US20170328980A1, published Nov. 16, 2017 to G. Charvat, entitled RADIO-FREQUENCY LOCALIZATION TECHNIQUES AND ASSOCIATED SYSTEMS, DEVICES, AND METHODS is a device comprising: a substrate; a semiconductor die mounted on the substrate; a transmit antenna fabricated on the substrate and configured to transmit radio-frequency (RF) signals at least at a first center frequency; a receive antenna fabricated on the substrate and configured to receive RF signals at least at a second center frequency different than the first center frequency; and circuitry integrated with the semiconductor die and configured to provide RF signals to the transmit antenna and to receive RF signals from the receive antenna. The '980 patent addresses the use of frequency diversity to supplement RSSI diversity measurements. In doing so it creates an opportunity to increase the reliability of positional measurements in mesh networks. The difficulty is that using frequency diversity to supplement RSSI measurements requires accurate clock synchronization within the mesh network. This is typically achieved using phase-locked loops that are DC power hungry and not applicable to low-cost low-energy applications. The '980 patent suffers from similar deficiencies as the '773 patent discussed above. For example, it has relatively low inter-node quality and does not identify the RF standard used. Furthermore, it does not describe how the mesh network can be used to determine ownership/possession of a node (product).

US20160363663A1, published Dec. 15, 2016 to D. Mindell entitled HIGH PRECISION TIME OF FLIGHT MEASUREMENT SYSTEM FOR INDUSTRIAL AUTOMATION is system for tracking position of objects in an industrial environment includes an interrogator, a transponder, and a processor. The interrogator transmits a signal and provides a first reference signal corresponding to the transmitted signal. The transponder provides a response signal. The interrogator receives the response signal and provides a second reference signal corresponding to the response signal. The processor determines a location of either the interrogator or the transponder, relative to the other, based on the two reference signals. The '663 patent does not provide a low cost, low energy system, or the ability for spatial diversity. Furthermore, like the above two patents, it does not identify the RF standard used.

US20160363648A1, published Dec. 15, 2018 to D. Mindell entitled HIGH PRECISION MOTION TRACKING WITH TIME OF FLIGHT MEASUREMENT SYSTEMS is a system for tracking an object includes a plurality of fixed devices and at least one tracked device. The fixed devices are positioned at fixed locations and the tracked device is affixable to the object. The fixed devices and the tracked device are configured to transmit and/or receive signals used for time of flight measurements. A processor is configured to determine one or more positions of the tracked device relative to one or more of the fixed devices based upon one or more time of flight measurements between the tracked device and one or more of the fixed devices. The '648 patent provides only one mobile node. Like the '980 and the '663 patents discussed above, the '648 does not provide a low cost, low energy system of nodes, or the ability for spatial diversity.

U.S. Pat. No. 9,234,757B2, issued Jan. 12, 2018 to O. Skaaksrud entitled DETERMINING NODE LOCATION USING A VARIABLE POWER CHARACTERISTIC OF A NODE IN A WIRELESS NODE NETWORK are methods and systems for enhanced node location determination by varying a power characteristic of nodes in a wireless node network are described. At least one of the nodes is instructed by a managing element in the network to incrementally change the power characteristic (e.g., change output power level and/or node receiver sensitivity). As the power characteristic incrementally changes, nodes are identified that initially received a signal broadcast from a first of the nodes but no longer receive the broadcast signal. As the power characteristic continues to incrementally change, a node is identified as a last of the nodes that receives the broadcast signal before none of the other nodes can receive the broadcast signal. As such, the identified last of the other nodes is a closest node to the first node. Then, a location of the first node is determined based upon the closest node to the first node. The '757 patent suffers from similar deficiencies as the above patents.

SUMMARY OF THE INVENTION

In one aspect, the present invention is embodied as a low energy mesh network system, including a mesh network, a Wi-Fi central station, an enhanced positional accuracy low energy (EPALE) wireless RF central station and product local fixed EPALE wireless RF beacons. The mesh network defines a virtual item container having virtual item container nodes defining boundaries for a physical container. The mesh network tracks items to be positioned within the physical container. The virtual item container nodes include EPALE wireless RF transceivers.

As used herein, the term enhanced positional accuracy low energy wireless RF or EPALE wireless RF refers to a node positional accuracy of less than 12 inches, preferably a positional accuracy less than or equal to 4 inches. This includes, for example, Bluetooth and UWB technologies.

In one embodiment distance estimations between the virtual item container nodes are determined by multiple RSSI measurements between the virtual item container nodes.

In one aspect the present invention is embodied as a physical container system for use with a low energy mesh network system for items positionable within a volume accessible by a low energy Bluetooth network. The physical container system includes a physical container having RF tags. The physical container is configured to operatively cooperate with a low energy mesh network system to indicate location of items positioned within the physical container.

In one embodiment the physical container is a cardboard box.

Unlike the Rhie '773 patent discussed above, the present invention provides a virtual container. The '773 patent does not address taking the next step by using the node positions and creating a virtual 3-D models of the containers. With the 3-D virtual container defined, any nodes inside the defined volume of the container can be associated with that container, larger containers defined outside that container, or an individual, etc.

Unlike the Charvat '980 patent discussed above, the present invention uses RSSI diversity measurements. The '980 patent does not generate, or describe building, mesh networks for spatial diversity or a system that generates a virtual cart/basket/box. The '980 patent does not identify the radio frequency standard used (WiFi, BLE, NFC, GPS, UWB), nor does it describe how a mesh network can be used to determine ownership/possession of a node (product). The '980 does not disclose a low-cost low energy system of nodes.

Unlike the Mindell '663, Mindell '648, and Skaaksrud '757 patents discussed above, the present invention is a low-cost low energy system of nodes that generates and describes building, mesh networks for spatial diversity. The '663, '648, and '757 patents are not systems that generates virtual cart/basket/box, and do not identify the RF standard used (WiFi, BLE, NFC, GPS, UWB). The '663, '648, and '757 patents do not describe how mesh network can be used to determine ownership/possession of a node (product).

DETAILED DESCRIPTION OF THE INVENTION

Figure 1:
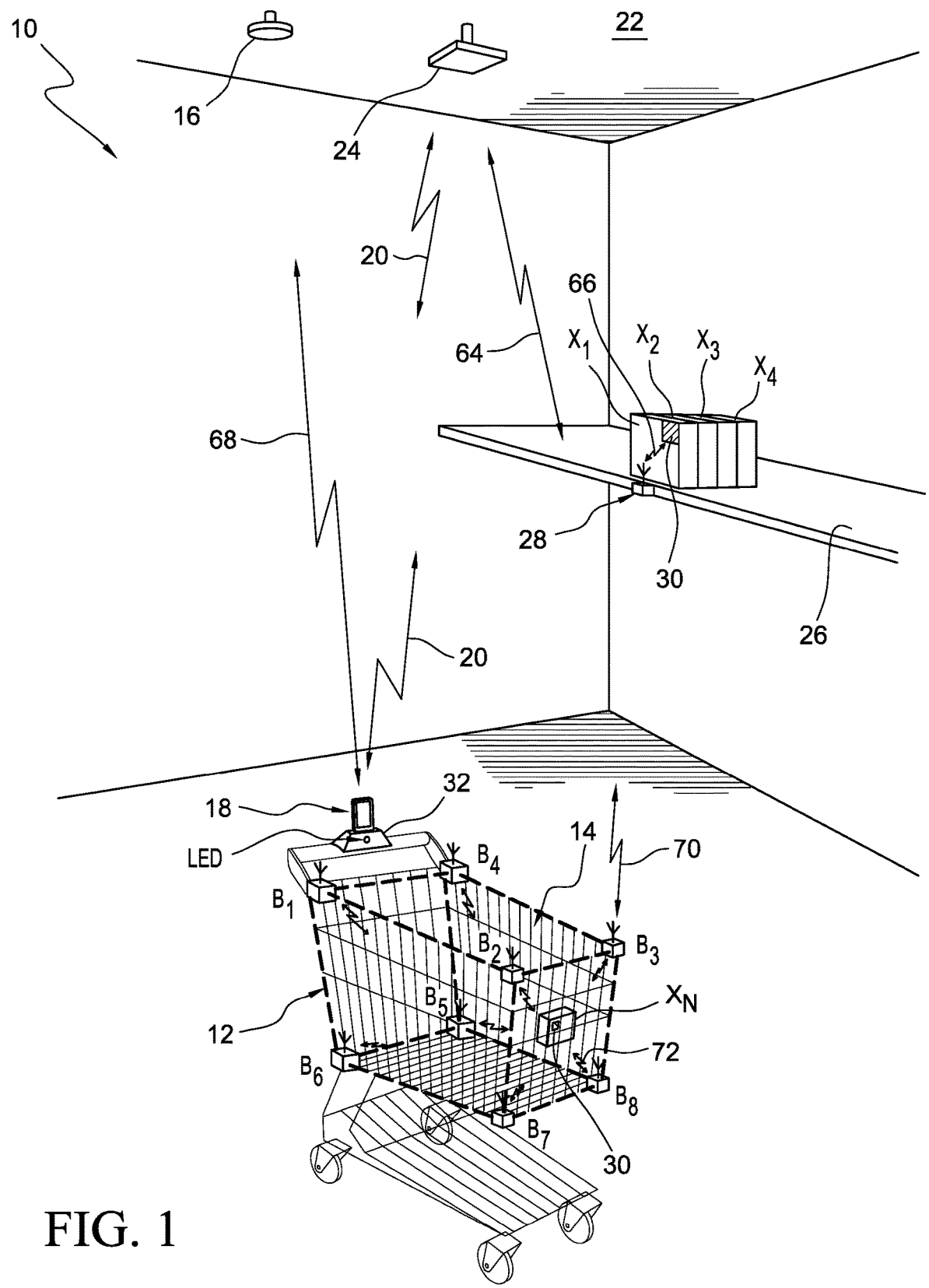
FIG. 1 is a simplified schematic diagram of a low energy mesh network system, in accordance with a preferred embodiment of the present invention, in a retail store environment.

Referring now to the drawings and the characters of reference marked thereon, FIG. 1 illustrates a preferred embodiment of the low energy mesh network system of the present invention, designated generally as 10, as implemented in a store environment. The low energy mesh network system 10 includes a mesh network, designated generally as 12. The mesh network 12 defines a virtual item container 12 having a plurality of virtual item container nodes $B_1$, $B_2$, $B_3$, $B_4$, $B_5$, $B_6$, $B_7$, $B_8$, defining boundaries for a physical container, such as a shopping cart 14. The mesh network tracks items to be positioned within the physical container 14. The virtual item container nodes comprise a plurality of Bluetooth low energy transceivers. A central station secure Wi-Fi 16 is operationally connectable (as indicated by arrows 68) to a smart device 18, typically a smart phone. In a typical retail environment, the central station, secure Wi-Fi 16 is positioned at the store ceiling 22. A low energy Bluetooth central station 24 is also typically positioned at the store ceiling 22. The store Bluetooth central station 24 may, for example, provide a beacon position ID less than or equal to 100 meters. In FIG. 1, a store shelf 26 is shown within the retail store environment. Several items $X_1$, $X_2$, $X_3$, $X_4$ are shown positioned on the store shelf 26. Local fixed Bluetooth beacons 28 are operably connected via link 66 to RF tags 30 positioned on the items $X_i$. The product local fixed Bluetooth beacons 28 are operably connected via link 64 to the Bluetooth central station 24 to indicate location of the products through the Bluetooth central station 24. The physical position of each product local fixed beacon 28 is known through the Bluetooth central station 24.

The passive RF (or RFID) tags 30 each have a UPC code and unique ID.

In a preferred embodiment, the shopping cart 14 includes a physical cradle 32 with or without a charger and a red-green LED. Use of the LED provides the capability of determining whether the smart phone 18 is properly operatively connected to the cart mesh network.

The smart phone 18 is typically equipped with a Wi-Fi that operates at 2.4/5.8 GHz. It utilizes a payment app to provide appropriate payment. It may include a cloud connection to obtain product information, on the spot. A link connection to the 4-8 virtual item container nodes $B_i$, i.e. Bluetooth low energy transceivers. The phone app sends a message to a dedicated Bluetooth low energy transceiver $B_D$ associated with the LED for the red/green light switch.

The product local fixed Bluetooth beacon 28 establishes a Bluetooth low energy link through the smart phone 18 (TCP/IP). The position of the beacon 28 is known within the store, so the shopping cart 14 position is known using the smart phone and shopping cart Bluetooth low energy transceivers. In a preferred embodiment, these shelf beacons 28 send product UPC+ID to the phone that then use the Wi-Fi back channel to display product information. The link established with the TCP/IP layer addresses exchange then routed to smart phone then store computer node via a Wi-Fi wireless connection.

The eight Bluetooth low energy transceivers $B_1$, $B_2$, $B_3$, $B_4$, $B_5$, $B_6$, $B_7$, $B_8$ create a "static" mesh network with unique TCP/IP addresses that "outline" the eight corners of the physical part creating a 3D box.

As product "y" is removed from the shelf and placed in the cart the proximity received signal strength indication (RSSI) information from $B_1 \ldots B_8$ indicates the passive tags on product "y" is physically inside the cart static mesh network. For position accuracy less than 3 feet RSSI is typically noisy so multiple polling is required with averaging per the process shown in FIG. 5.

The smart device app serves as a conduit between the network of nodes and the financial transaction portion of the process. The smart device app identifies the customer, which relays customer's information to the store computer software to verify customer's account. This allows the store's computer software to track and record the items customer has input in the cart or basket. Distance estimations are preferably determined by multiple RSSI measurements between virtual item container nodes. Virtual item container nodes comprise fixed nodes in the mesh network. Distance estimations to variable nodes determine whether the variable nodes are inside or outside the virtual item container. The estimation accuracy is dependent on distance measurements between the virtual item container nodes made to arrive at an average that is at a predefined accuracy. The accuracy is impacted by link impairments such as multipath, shadowing, blockage and environmental electromagnetic noise.

Thus, in summary of the FIG. 1 embodiment, distance estimations are determined by multiple RSSI measurements between nodes. This is accomplished utilizing the following technique/criteria: The fixed (8 for example) node mesh of the cart/basket/box defines the "volume". The distance estimations to other nodes from the above 8 nodes. This determines whether the other nodes are inside or outside the 8-node defined volume. The estimation accuracy is dependent on how many distance measurements are made to arrive at an average that is accurate to within a few inches and how the number of measurements needed (i.e. as the number of measurements increases the faster the batteries in the nodes are drained) to get the accuracy is impacted by link impairments such as multipath, shadowing, blockage and environmental electromagnetic noise.

The link between the master node 24 and the fixed beacon node(s) 28 is indicated by arrow 64. The link between the fixed beacon node 28 and the mobile "tag" node 30 of the commodity on the shelf is indicated by arrow 66. The Wi-Fi link between the mobile device 18 and the Wi-Fi central station 16 is indicated by arrow 68. The link between the fixed mobile nodes $B_1$, $B_2$, $B_3$, $B_4$, $B_5$, $B_6$, $B_7$, $B_8$ and the fixed beacon nodes 28 is indicated by arrow 70. The link between the fixed mobile nodes $B_1$, $B_2$, $B_3$, $B_4$, $B_5$, $B_6$, $B_7$, $B_8$ and the mobile "tag" node on the commodity $X_N$ is indicated by arrow 72.

Figure 2:
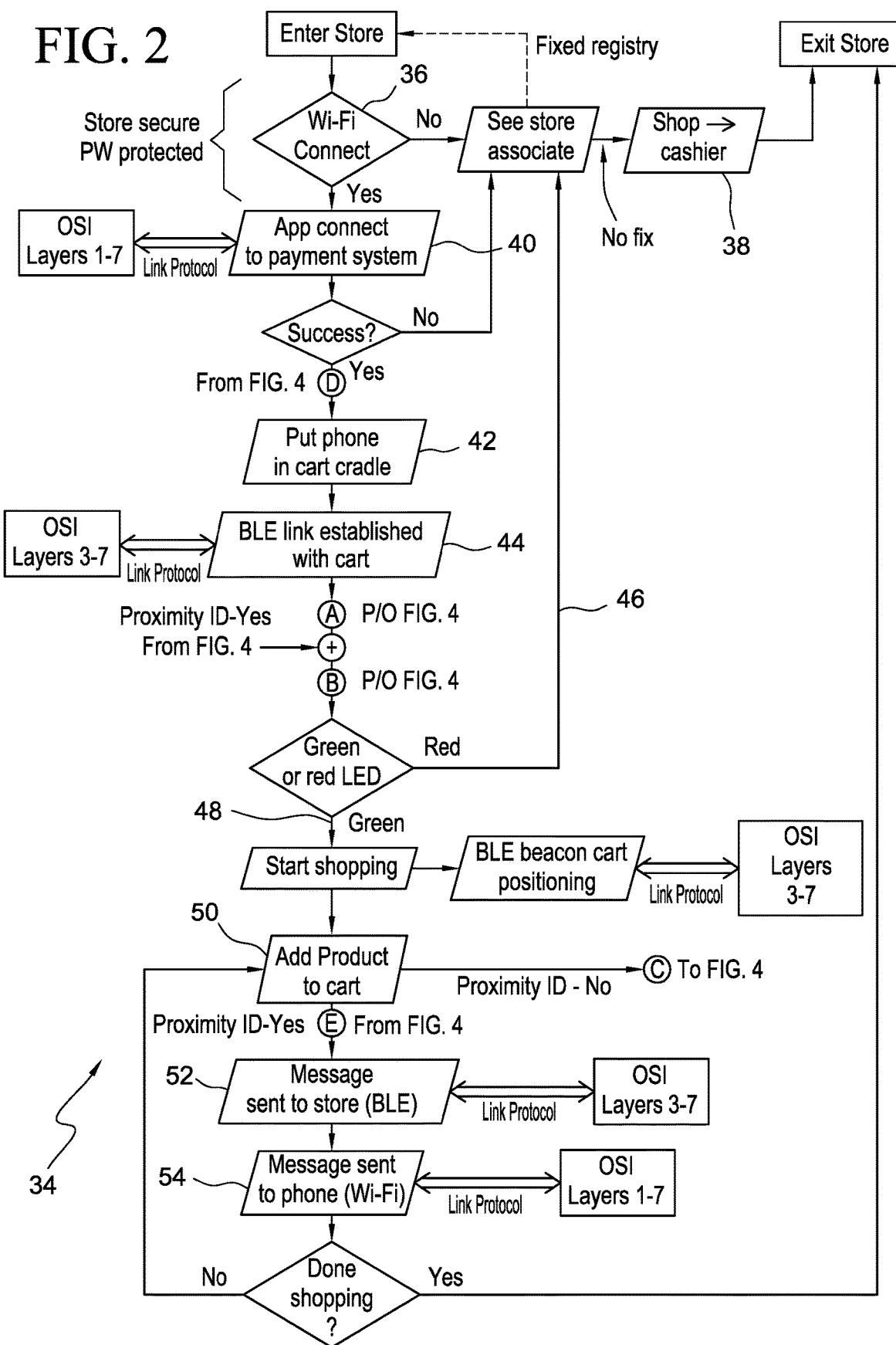
FIG. 2 is a protocol flow diagram of the embodiment of FIG. 1.

Referring now to FIG. 2, a protocol flow diagram of the system and method of the low energy mesh network of the present invention is illustrated, designated generally as 34. In a first step as the customer enters the store, he or she is required to connect to the store's Wireless Network (36). If the customer is unsuccessful in connecting, the store associate should be available to assist. If the issues continue to occur, the customer is still able to shop, however he or she will check out with a cashier at the end of shopping (38). However, if the customer connects to the store's Wireless Network, the downloaded app on the customer's smart phone will automatically connect to the payment system (40). Once the customer is connected to the app, the customer must place the phone in a cart cradle (42). This enables the TCP/IP connection (44) between the smart phone app and the cart which is indicated with the green or red LED light. If the red light is flashing (46), the customer is required to seek the store associate for assistance. If the green light is flashing (48), the customer is ready to start the shopping. As the customer places the products into the cart (50), the proximity ID is recognized, and message is sent to the phone (52), indicating the placement of the product into the cart. If the proximity ID is not recognized, the customer will be notified of the occurring issue via the app. This may be by, for example, a red signal on the cradle.

The sound system placed in the store will inform the customer service that the customer needs assistance. Once the message has been sent to the customer's smart phone, the store's wireless network (54) is notified that the product has been taken off the shelf and placed in the customer's cart. This system follows until the customer has completed his or her shopping, and all the necessary products are placed in the customer's cart. When the customer has completed his or her shopping, he, or she may exit the store as the bill is automatically charged through the customer's smart phone app.

The present invention has applications beyond the retail environment described above. The present invention may be used for many applications, for example, with seafood distributors, as will be discussed below. In such a scenario seafood is packaged in a cardboard box and then transported to the retailer. The temperature of the seafood is sensed and monitored all the way through the transportation process to the ultimate customer. Therefore, the system is like that described in a retail store environment above, in the processing plant, and like the one described in the retail environment in the transportation process inside the truck. A similarity is that the BLE of the low energy Bluetooth standard is limited in the distance it can operate (i.e. approximately 20 to 30 meters). The processes and techniques described above relative to the retail environment are like that of the truck and processing environment. In the retail store example, the sensors in the corners of the cart determined what items were passing along ID tag information.

Figure 3:
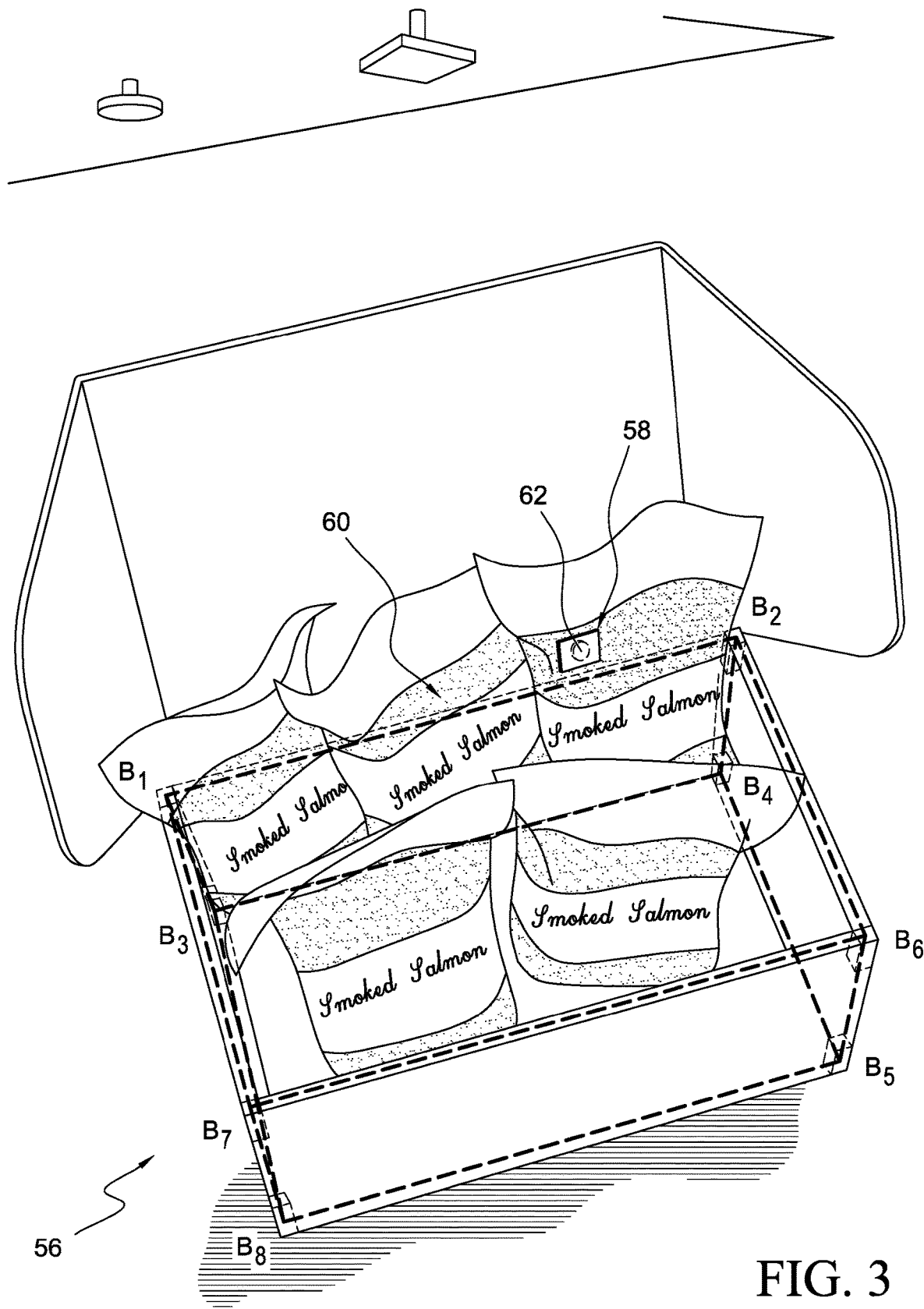
FIG. 3 illustrates utilization of the principles of the present invention in a fish processing environment.

Referring now to FIG. 3, in a seafood transportation/processing environment a cardboard box 56 can be utilized for carrying salmon. In one embodiment, the box 56 is equipped with eight Bluetooth low energy transceivers $B_1$, $B_2$, $B_3$, $B_4$, $B_5$, $B_6$, $B_7$, $B_8$ that create a "static" mesh network with unique TCP/IP addresses (links) that "outline" the eight corners of the cardboard box, in the same manner as the cart. In some embodiments the box is equipped with transceivers built in. The cost of the transceivers can be made to be very low, so that the cost of the boxes in volume are not impacted significantly. This is particularly useful with large volumes, i.e., the order of 100,000s per month. The appropriate tooling is required to manufacture the cardboard boxes with the devices embedded. In other embodiments, the stick-on transceivers are applied on the inside corners of the box during manufacture.

It is preferred that the eight Bluetooth low energy transceivers $B_1$, $B_2$, $B_3$, $B_4$, $B_5$, $B_6$, $B_7$, $B_8$ be embedded in the cardboard matrix so there is a clear line-of-sight between all eight RF nodes, that is, any one corner would have a clear line-of-sight through the RF transparent cardboard to six neighbors as a minimum for triangulation and distance measurements. Only the opposite corner could be blocked by the items inside the cardboard box (or the cart/basket for that matter, relative to the previous embodiment). Although the box has been discussed as being formed of cardboard it can be made of several suitable materials such as such as plastic or wood. If the RF beacons or tags are inside the container, the container cannot be made from any material, e.g. metallic materials that are not transparent to RF transmissions, as that would impair the air interface link between the nodes.

In the first embodiment, the sensors in the eight corners of the cart determine what items are inside of the volume by passing along the ID tag information. The system distinguishes what is outside and what is inside of the volume of the eight ID tags. In a processing environment, salmon, for example, is put in a box, and in each of the eight corners of the cardboard box have sensors $B_1$, $B_2$, $B_3$, $B_4$, $B_5$, $B_6$, $B_7$, $B_8$ that sense the passive tags 58 that have been attached to each of the salmon fish 60. The present system enables augmented features such as the use of temperature sensors in the form of passive sensors 62 incorporated in the ID tag 58. The passive sensors 62 are queried by the eight sensors on each corner of the cardboard box that contains the fish. These ID tags, also, can distinguish between fish that are placed inside the box, and disregard any ID tags that are sensed but are located outside the cardboard box. The products have a spatial relationship with the eight tags that are defining the volume (i.e. virtual container). As discussed above, this spatial relationship has its limits due to the Bluetooth low energy standard. This type of relationship depends on the distance which is possible to up to 90 feet.

Although the low energy mesh network system has been described in detail with reference to the Bluetooth standard other suitable low energy wireless RF standards can be used with the low energy wireless RF transceivers, low energy wireless RF central station, and wireless RF beacons. Such other low energy wireless RF standards may include, for example, WiFi, NFC, GPS, and UWB. As discussed above, the low energy wireless RF transceivers, low energy wireless RF central station, and wireless RF beacons should be enhanced positional accuracy low energy (EPALE).

Figure 4:
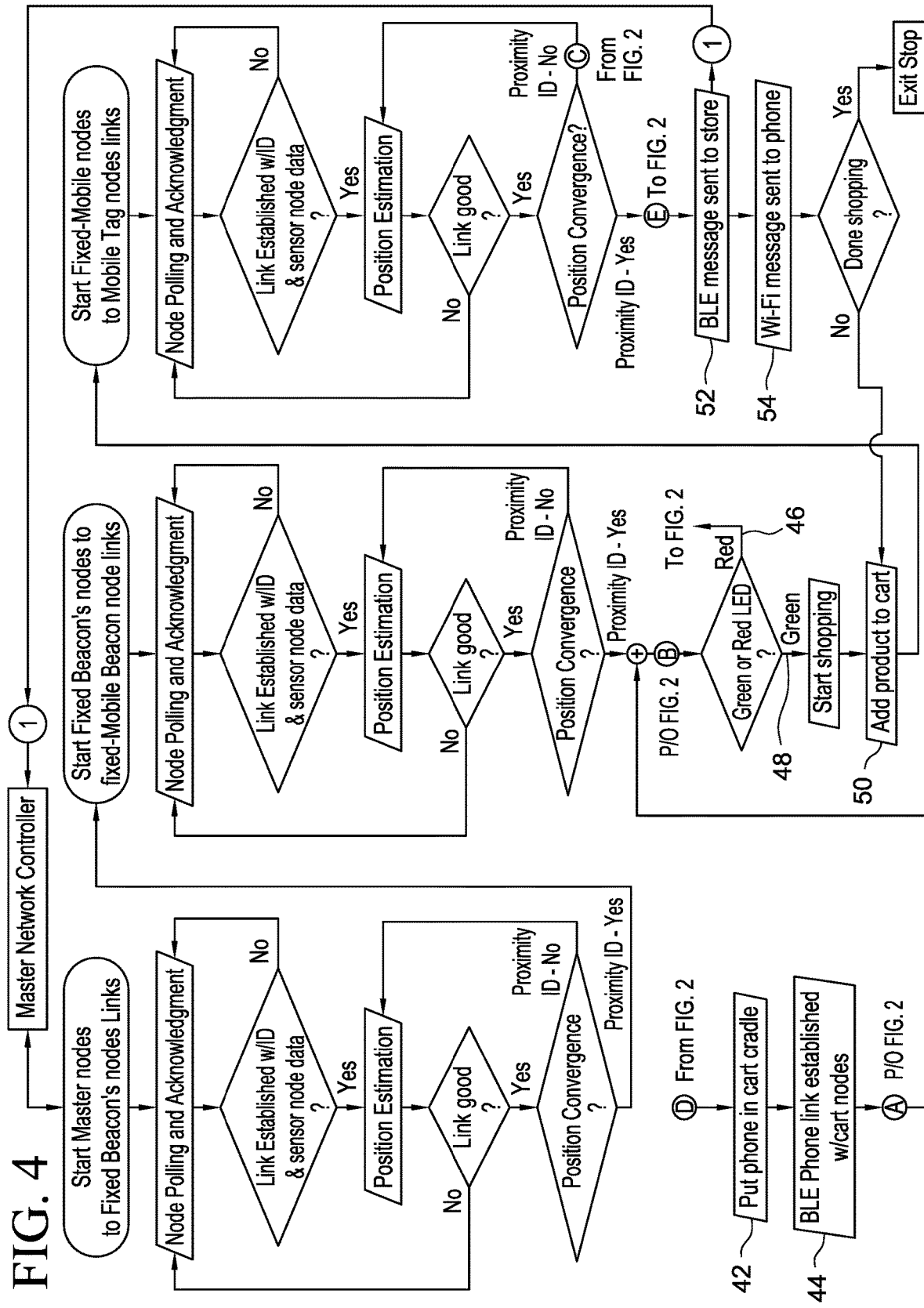
FIG. 4 is flow diagram providing details from the FIG. 2 protocol diagram regarding position estimations.

Referring now to FIG. 4, a flow diagram providing details from the FIG. 2 protocol diagram is provided regarding position estimations.

Figure 5:
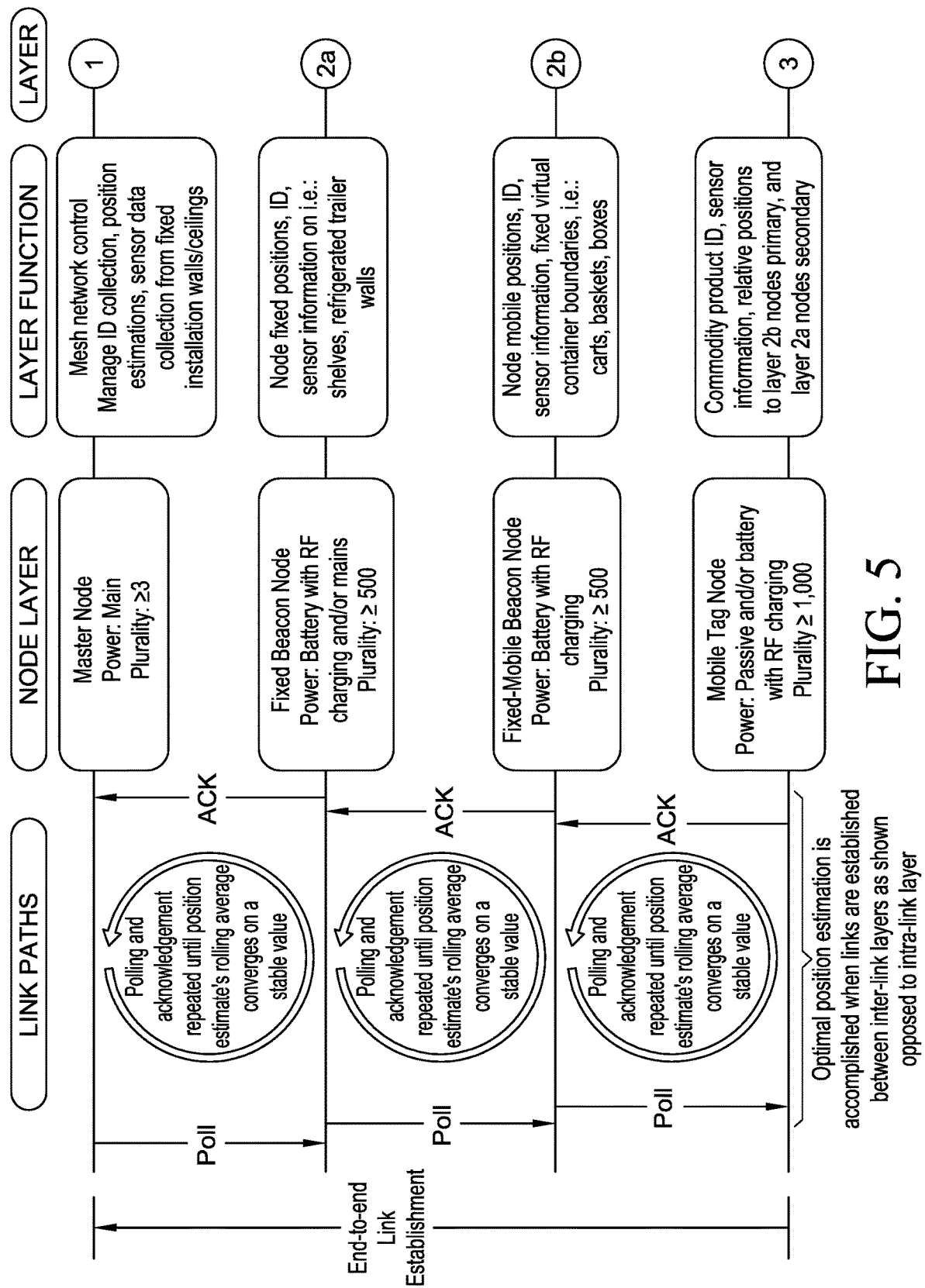
FIG. 5 illustrates the interactivity of the mesh network node layers.

Although there are various ways that the proximity determinations can be made a preferred embodiment is as follows, referring to FIG. 5:

A preferred embodiment of a mesh network includes three layers of nodes. The following describes the establishment of the physical link between the three types of nodes within the mesh network and the subsequent absolute and relative position estimation process between the nodes.

1) Master node(s) (at least three for triangulation, more than three for "multi-angulation") connected to the central computer processor that runs all the algorithms that manage communications between all the nodes in the network and perform all the calculations based on RSSI lateration, modulation/demodulation, timing, angle of arrival, or fingerprinting.

2) The second layer consists of local fixed Bluetooth beacons that are the first link established with the Master node. Local fixed Bluetooth beacons can be numbered in the several hundred for the envisioned network to enhance the various methods of position estimations. Typically, the more beacons there are the more accurate the position estimates. For example, with current technology 100 beacons will result in positional accuracies in the 10 cm (4 inch) range. There are two subtypes of beacons, a) fixed beacons and b) mobile beacons. The fixed beacons in a store environment are affixed to shelves or other fixed structures. The fixed beacons in a truck are attached to the inside of the trailer. These beacons have a battery with enough charge to last several months or years with normal use. They are capable of being recharged via RF wireless charging systems. The mobile beacons would be affixed to containers such as boxes, shopping carts (e.g. $B_1$, $B_2$, $B_3$, $B_4$, $B_5$, $B_6$, $B_7$, $B_8$, shown in the above example), or shopping baskets. Although these beacons are attached to items that are mobile, the beacons attached to a unique container have a relative positional relationship to each other that is fixed. This fixed characteristic is utilized or exploited to allow the system to create a virtual container volume with distinct boundaries that define its inside area and its outside area.

3) The third layer comprises passive or very low power tag-like nodes. For example, BLE passive tags (e.g., passive RFID tags 30 described in the above example). These tags are placed on the items that are to be identified, tracked, and monitored.

Positional estimation methods are discussed below and shown in FIG. 5:

The three air interfaces between 1) Master node and fixed beacons, 2) fixed beacons and fixed-mobile beacons, and 3) fixed-mobile beacons and tags are critical because the reliability and robustness of the link, directly related to the position estimation accuracy, are impacted by multipath effects, especially destructive multipath or fading. Statistical methods are used to overcome these link impairments requiring persistent polling between all three node layers across the two previously identified, link air interfaces. Statistical methods are applied, but not limited to, measurements of time of flight, angle of arrival, signal strength (RSSI), using triangulation, and multi-angulation algorithms to determine, within set accuracy limits, a node's true position.

To begin the process the master node searches the environment for fixed beacons, sending out messages and waiting for acknowledgements Each beacon responds with a unique identifier that the master node computer catalogs. Association to the unique ID are also recorded based on the position of the beacon determined using the methods listed in the previous paragraph. This process is repeated until the positions of every fixed beacon converges to a single moving average positional value that is time invariant.

Once the fixed beacon nodes are accounted for and their positions are known to within the set accuracy limit the second air interfaces between the fixed beacons and the mobile beacons are established. The mobile beacons are fixed to the containers that may change position within the area defined by the fixed beacons whose links and positions are already established. Remember that the mobile beacons have time variant link relationships with the fixed beacons, but static link relationships between subsets of the mobile beacons that are part of, for example, a unique container. That is, there are subsets of mobile beacons that are a fixed distance away from neighboring beacons nodes as part of a single container. The process of establishing a link between the fixed beacon nodes and the mobile nodes proceeds the same way as the master node to the fixed beacons. Once that process is complete and the positions of the mobile nodes are known and their positional relationship to each other for a unique container, the mesh networking system (all controlled and monitored by the master computer located behind the master nodes) can then create the virtual container volume and boundaries and the virtual containers volume within the larger virtual space defined by the fixed beacon nodes.

At this point the virtual container boundary has been established, the frequency of polling has been established to determine, second to second, the position of every node whether fixed or mobile to within the established accuracy limits. Now the final link (the final air interface) is established between the mobile nodes associated with a container, their relative positions to each other established to create a virtual container volume, and the passive tags associated with a commodity of value. The mobile set of fixed container nodes sends a query out and the passive tag sends a response with its unique identifier and other information associated with a plurality of commodity sensors. The same statistical methods of closing the link and identifying position are used as the master nodes to the fixed beacons except the outcome will be to determine if the passive tag and associated commodity is inside or outside the virtual container established in the preceding link and position process.

Thus, the ownership relationship of the commodity of interest can be determined, identified and relayed, as desired.

There are many environments in which the principles of the present invention can be utilized. Generally, the invention can be applied where the positional relationship between two entities needs to be known, such as shopper and purchases. These include, for example, no-check-out shopping, inventory control, shipping and receiving, product quality control (vibration, shock, temperature, etc.), product safety (proximity alarms, refrigeration, etc.), gaming, security, grocery, and distribution facilities.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

For example, although the system of the present invention has been described with respect to a smart device, other suitable computing systems can be utilized that can bridge the various wireless standards (WiFi, BLE, cellular, UWB, etc.) and complete a financial transaction.

The invention claimed is:

1. A low energy mesh network system for an environment, comprising:
   a) a mesh network defining a virtual item container having a plurality of virtual item container nodes defining boundaries for a physical container, said mesh network for tracking items to be positioned within said physical container, said virtual item container nodes comprising a plurality of enhanced positional accuracy low energy (EPALE) wireless RF transceivers;
   b) a Wi-Fi central station secure Wi-Fi operationally connectable to a computing system;
   c) an EPALE wireless RF central station operationally connectable to said computing system; and,
   d) a plurality of product local fixed EPALE wireless RF beacons operably connected to RF tags positioned on the items, said product local fixed EPALE wireless RF beacons being fixed to a fixed location in the environment and not fixed to the physical container, and being operably connected to said EPALE wireless RF central station to indicate location of the items through the EPALE wireless RF central station;
   wherein said EPALE wireless RF transceivers comprise Bluetooth low energy wireless RF transceivers, said EPALE wireless RF central station comprises a Bluetooth wireless RF central station, and said product local fixed EPALE wireless RF beacons comprise Bluetooth wireless RF beacons.

2. The low energy mesh network system of claim 1, wherein distance estimations between said virtual item container nodes are determined by multiple RSSI measurements between said virtual item container nodes.

3. The low energy mesh network system of claim 1, wherein said mesh network comprises a cart mesh network and said physical container comprises a shopping cart, said cart mesh network comprising eight cart nodes each being positioned on a respective corner of each shopping cart, each cart node comprising a Bluetooth low energy (BLE) transceiver with a unique TCP/IP address.

4. The low energy mesh network system of claim 1, wherein said mesh network is in a retail store environment.

5. The low energy mesh network system of claim 1, wherein said mesh network is in a food processing/transportation environment.

6. The low energy mesh network system of claim 1, wherein distance estimations are determined by multiple RSSI measurements between virtual item container nodes wherein, said virtual item container nodes comprise fixed nodes in said mesh network, distance estimations to variable nodes determining whether the variable nodes are inside or outside the virtual item container, the estimation accuracy being dependent on distance measurements between said virtual item container nodes made to arrive at an average that is at a predefined accuracy.

7. The low energy mesh network system of claim 1, said computing system comprises a smart device.

8. A low energy mesh network for a retail environment, comprising:
   a) a mesh network defining a virtual item container having a plurality of virtual item container nodes defining boundaries for a physical container, said mesh network for tracking items to be positioned within said physical container, said virtual item container nodes comprising a plurality of Bluetooth low energy transceivers;
   b) a central station secure Wi-Fi operationally connectable to a customer's computing system;
   c) a low energy Bluetooth central station; and
   d) a plurality of product local fixed Bluetooth beacons operably connected to RF tags positioned on the items, said product local fixed Bluetooth beacons being fixed to a fixed location in the retail environment and not fixed to the physical container, and being operably connected to said central station Bluetooth to indicate location of the items through the central station Bluetooth.

9. The low energy mesh network of claim 8, further comprising a cradle positionable on the physical container for supporting the customer's smart device, said cradle being operably connected to the smart device.

10. The low energy mesh network of claim 8, further comprising a cradle positionable on the physical container for supporting the customer's smart device, said cradle being operably connected to the smart device, said cradle including indication lights for indicating an insertion of the item into the shopping cart.

11. The low energy mesh network of claim 8, wherein said customer's computing system comprises a smart device having a payment app.

12. A physical container system for use with a low energy mesh network system for items positionable within a volume accessible by a low energy Bluetooth network within an environment, comprising:
   a physical container having a plurality of RF tags, said physical container configured to operatively cooperate with a low energy mesh network system to indicate location of items positioned within said physical container
   wherein said physical container is configured to operate with said low energy mesh network system of a type, comprising:
   a) a mesh network defining a virtual item container having a plurality of virtual item container nodes defining boundaries for said physical container, said mesh network for tracking said items to be positioned within said physical container, said virtual item container nodes comprising a plurality of Bluetooth low energy transceivers;
   b) a central station secure Wi-Fi operationally connectable to a computing system;
   c) a low energy Bluetooth central station; and,
   d) a plurality of product local fixed Bluetooth beacons operably connected to said RF tags positioned on the items, said product local fixed Bluetooth beacons being fixed to a fixed location in the environment and not fixed to the physical container, and being operably connected to said Bluetooth central station to indicate location of the items through the Bluetooth central station.

13. The physical container system of claim 12, wherein said physical container comprises a cardboard box.

14. A method for utilizing a low energy mesh network for an environment, for identifying items in a physical container, comprising the steps of:
   a) Wi-Fi connecting a computing system to a Wi-Fi central station;
   b) Bluetooth connecting said computing system to a Bluetooth central station;
   c) polling product local fixed Bluetooth beacons operably connected to RF tags positioned on items, said product local fixed Bluetooth beacons being fixed to a fixed location in the environment and not fixed to the physical container, and being operably connected to said Bluetooth central station, wherein, a mesh network defining a virtual item container having a plurality of virtual item container nodes define boundaries for a physical container, said mesh network for tracking items to be positioned within a physical container, said virtual item container nodes comprising a plurality of Bluetooth low energy transceivers.

* * * * *